(12) United States Patent
Shao et al.

(10) Patent No.: US 11,773,571 B1
(45) Date of Patent: Oct. 3, 2023

(54) METHODS AND INTERNET OF THINGS (IOT) SYSTEMS FOR MANAGING PUBLIC WATER IN SMART CITY

(71) Applicant: CHENGDU QINCHUAN IOT TECHNOLOGY CO., LTD., Sichuan (CN)

(72) Inventors: Zehua Shao, Chengdu (CN); Xiaojun Wei, Chengdu (CN); Zhihui Wen, Chengdu (CN); Yong Li, Chengdu (CN); Bin Liu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/804,084

(22) Filed: May 25, 2022

(30) Foreign Application Priority Data

Mar. 24, 2022 (CN) .......................... 202210291945.8

(51) Int. Cl.
*E03B 3/02* (2006.01)
*G06Q 50/06* (2012.01)
*H04L 67/12* (2022.01)
*G16Y 10/35* (2020.01)

(52) U.S. Cl.
CPC .............. *E03B 3/02* (2013.01); *G06Q 50/06* (2013.01); *H04L 67/12* (2013.01); *G16Y 10/35* (2020.01); *Y02A 20/00* (2018.01)

(58) Field of Classification Search
CPC ........... E03B 3/02; G06Q 50/06; H04L 67/12; G16Y 10/35; Y02A 20/00
(Continued)

(56) References Cited

U.S. PATENT DOCUMENTS

| 2014/0324223 | A1* | 10/2014 | Kobayashi | .............. | C02F 1/008 |
| | | | | | 700/275 |
| 2019/0324179 | A1* | 10/2019 | Thyagarajan | ............ | G02B 1/00 |
| 2020/0370283 | A1* | 11/2020 | Wang | ...................... | C02F 1/004 |

FOREIGN PATENT DOCUMENTS

| CN | 105178387 A | 12/2015 |
| CN | 205608502 U | 9/2016 |

(Continued)

OTHER PUBLICATIONS

Shao, Zehua, Exploration and Research on the Structure of Internet of Things, Internet of Things Technologies Reliable Transmission, 2015, 10 pages.
(Continued)

*Primary Examiner* — Kyle R Quigley
*Assistant Examiner* — Dacthang P Ngo
(74) *Attorney, Agent, or Firm* — METIS IP LLC

(57) ABSTRACT

The present disclosure provides a method and system for managing public water in a smart city. The method may be performed by an urban public water management platform. The method may include: obtaining initial rainwater data in at least one area, the initial rainwater data may include rainfall data and rainwater collection data of at least one rainwater collection system, each of the at least one rainwater collection systems corresponding to at least one rainwater collection mode; determining the amount of purified rainwater during a first period corresponding to the at least one rainwater collection mode according to the initial rainwater data in the at least one area; and determining a rainwater storage plan during a second period based on the amount of purified rainwater during the first period corresponding to the at least one rainwater collection mode.

11 Claims, 5 Drawing Sheets

(58) Field of Classification Search
USPC .......................................................... 702/50
See application file for complete search history.

(56) References Cited

FOREIGN PATENT DOCUMENTS

| | | |
|---|---|---|
| CN | 108537390 A | 9/2018 |
| CN | 111535420 A | 8/2020 |
| CN | 112231425 A | 1/2021 |
| KR | 102150280 B1 | 9/2020 |

OTHER PUBLICATIONS

Shao, Zehua, The Internet of Things sense the world beyond the world, China Renmin University Press, 2017, 30 pages.
Shao, Zehua, Smart City Architecture, Internet of Things Technologies Intelligent Processing and Application, 2016, 7 pages.
White Paper on Urban Brain Development, Smart City Standard Working Group of National Beacon Commission, 2022, 59 pages.
Gui, Fang, Research on Intelligent Water Production Monitoring System Based on Cloud Internet of Things, Gansu Science and Technology, 2017, 4 pages.
Ding, Zhibin et al., Adjustment and Storage Capacity Calculation for Initial Rainwater Based on Theoretical Analysis of Rain Fall Process, Water Purification Technology, 30(1): 75-78, 2011.
First Office Action in Chinese Application No. 202210291945.8 dated May 5, 2022, 24 pages.
Decision to Grant a Patent for Invention in Chinese Application No. 202210291945.8 dated May 11, 2022, 2 pages.

* cited by examiner

500

```
┌─────────────────────────────────────────────────┐  510
│  Obtaining a rainwater storage plan during a second │
│  period of at least one target area from a management│
│     platform database based on a water use plan     │
└─────────────────────────────────────────────────┘
                         │
                         ▼
┌─────────────────────────────────────────────────┐  520
│   Determining the water supply plan during the second │
│    period of the at least one target area based on the│
│     obtained water use plan, the rainwater storage plan│
│   during the second period of the at least one target area,│
│         and the significance of the target area        │
└─────────────────────────────────────────────────┘
```

FIG. 5

METHODS AND INTERNET OF THINGS (IOT) SYSTEMS FOR MANAGING PUBLIC WATER IN SMART CITY

CROSS-REFERENCE TO RELATED APPLICATION

This application claims priority of Chinese Patent Application No. 202210291945.8, filed on Mar. 24, 2022, the contents of which are entirely incorporated herein by reference.

TECHNICAL FIELD

The present disclosure relates to the field of IoT and cloud platforms, and in particular, to a method and IoT system for managing public water in a smart city.

BACKGROUND

As one of the most important natural resources, environmental resources, and economical resources to sustain the existence, living and production of human beings, the efficient development and utilization of water resources is an important basis for ensuring sustainable development of human society. Extensive water resources management mode is no longer in line with the requirements of the times, and adjusting the gap between water-poor areas and water-abundant areas may be an important water resource management method. With the development of information science and technology, the concept of cloud platform and its application in the IoT is becoming increasingly extensive, which may be used to provide efficient and reasonable water distribution modes.

Therefore, a method and IoT system for managing public water in a smart city is needed. Using the IoT system and the cloud platform, the efficiency and generality of the system and method of public water management may be improved, thereby realizing the efficient management of the water resources.

SUMMARY

One of the embodiments of the present disclosure provides a method for managing public water in a smart city, which may be performed by an urban public water management platform, the method may include: obtaining initial rainwater data in at least one area, the initial rainwater data may include rainwater collection data of at least one rainwater collection system and rainfall data, each of the at least one rainwater collection system may be corresponding to at least one rainwater collection mode; determining the amount of purified rainwater during a first period corresponding to the at least one rainwater collection mode according to the initial rainwater data in the at least one area; and determining a rainwater storage plan during a second period based on the amount of purified rainwater during the first period corresponding to the at least one rainwater collection mode.

One of the embodiments of the present disclosure provides a system for managing public water in a smart city, the system may include a user platform, a service platform, an urban public water management platform, a sensing network platform, and an object platform, and the urban public water management platform may be configured to perform the following operations: obtaining initial rainwater data in at least one area, the initial rainwater data may include rainwater collection data of at least one rainwater collection system and rainfall data, each of the at least one rainwater collection systems corresponding to at least one rainwater collection mode; determining the amount of purified rainwater during a first period corresponding to the at least one rainwater collection mode according to the initial rainwater data of the at least one area; and determining a rainwater storage plan during a second period based on the amount of purified rainwater during the first period corresponding to the at least one rainwater collection mode.

One of the embodiments of the present disclosure provides a computer readable storage medium, the storage medium stores computer instruction, when the computer reads the computer instruction in the storage medium, the computer operates the method for managing public water in a smart city.

BRIEF DESCRIPTION OF THE DRAWINGS

The present disclosure will be further described in the way of exemplary embodiments, which will be described in detail by the drawings. These embodiments are not limited, in these embodiments, the same number denote the same structure, where:

FIG. 5 is an exemplary flowchart illustrating a process of the determination of a water supply plan of a target area according to some embodiments of the present disclosure.

DETAILED DESCRIPTION

Figure 1:
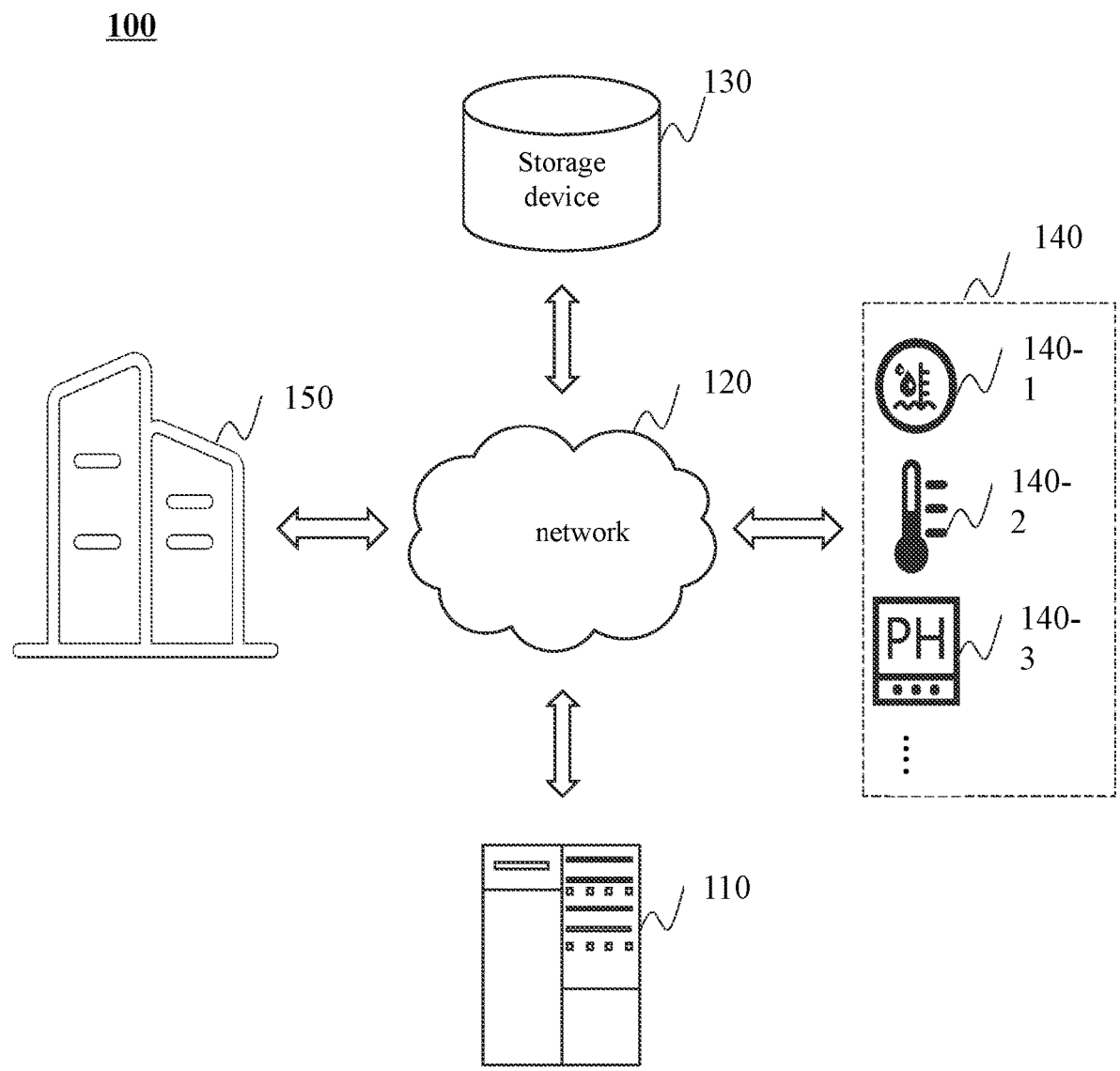
FIG. 1 is a schematic diagram of the application scene illustrating a public water processing system according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "device," "unit," and/or "module" used herein are one method to distinguish different components, elements, parts, sections, or assemblies of different levels. However, the terms may be displaced by another expression if they achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

FIG. 1 is a schematic diagram of the application scene 100 illustrating a system for managing public water in a smart city according to some embodiments of the present disclosure.

In some embodiments, a rainwater storage plan may be determined by implementing the methods and/or processes disclosed in the present disclosure based on a system for managing public water in a smart city.

As shown in FIG. 1, the application scene 100 of the present disclosure may include a processing device 110, a network 120, a storage device 130, a collection terminal 140, and a water supply party 150. In some embodiments, the components in the application scene 100 may be connected and/or communicate with each other through the network 120. For example, the processing device 110 may connect to the storage device 130, the collection terminal 140, and the water supply party 150 through the network to access to information and/or data. For another example, the processing device 110 may obtain data and/or information from the collection terminal 140, and process the obtained data and/or information.

The processing device 110 may be configured to process information and/or data related to the application scene 100, for example, rainfall data, rainwater collection data, or the like. The processing device 110 may process data, information, and/or processing results obtained from other devices or system components, and perform program instructions based on these data, information, and/or processing results to perform one or more functions described in the present disclosure.

The network 120 may connect each component of the application scene 100 and/or connect the application scene 100 with an external resource. The network allows communication between the components and between the components and the parts other than the application scene 100 to facilitate the exchange of data and/or information. The network may be a local area network, a wide area network, an internet, or the like, or the combination of a variety of network structures.

The storage device 130 may be configured to store data, instructions, and/or any other information. In some embodiments, the storage device 130 may store data and/or instructions used to perform or complete the exemplary methods described in the present disclosure. In some embodiments, the storage device 130 may be connected to the network 120 to communicate with at least one component of the application scene 100 (e.g., processing device 110, collection terminal 140). For example, the storage device 130 may store rainfall data, rainwater collection data.

The collection terminal 140 may be configured to collect data and/or information, for example, the rainfall data, the rainwater collection data, etc. In some embodiments, the collection terminal 140 may include a water gauge 140-1, a rainfall gauge 140-2, a water quality detector 140-3, or the like. In some embodiments, the collection terminal 140 may send the collected data and/or information to other components (e.g., the processing device 110) of the application scene 100 through the network 120. More about the collection terminal may be referred to FIG. 2 and related descriptions.

The water supply party 150 may be configured to collect and/or store rainwater resources, and may further be configured to supply and/or dispatch water resources. For example, the water supply party may supply the water resources to the user. For another example, the water supply party may dispatch water resources in the water-abundant areas to the water-poor areas (e.g., South-to-North Water Diversion Project). An exemplary water supply party may include each municipal water supply company under Water Affairs Bureau or Water Conservancy Bureau.

It should be noted that the application scene is only provided for the purpose of illustration, and is not intended to limit the scope of the present disclosure. For those skilled in the art, various modifications or variations may be made in accordance with the descriptions of the present disclosure. For example, the application scene may further include a database. For another example, the application scene may be implemented on other devices to achieve similar or different functions. However, the changes and modifications do not depart from the scope of the present disclosure.

The IoT system refers to an information processing system including a part or all of a user platform, a service platform, a management platform, and a sensing network platform. The user platform may dominate the IoT operation system, user's needs may be the basis and premise that forms the IoT operation system, and the links among the other platforms of the IoT system are to meet the user's needs. The service platform may provide users with input and output services, which is a bridge between the user and the management platforms. The management platform may achieve overall planning and coordination of the connection and cooperation between various functional platforms (such as sensing network platform, object platform). The management platform gathers the information of the IoT operation system, and may provide perception management and control management for the IoT operation system. The sensing network platform may connect the management platform and the object platform, and functions to percept and control information sensing communication. The object platform may be a functional platform to obtain perception information and perform control information.

The information processing in the IoT system may be divided into processing flow of perceptual information and processing flow of control information, and the control information may be information generated based on the perceptual information. The processing of perceptual information may be to obtain perceptual information by the object platform, and transmit the perceptual information to the management platform through the sensing network platform. The management platform may transmit the calculated perceptual information to the service platform, and the service platform may transmit the information to the user platform, the user platform may generate the control information through the determination and analysis of the perceptual information. The control information may be generated by the user platform and sent to the service platform, and the service platform may then pass the control information to the management platform. The management platform may calculate the control information, and send it to the object platform through the sensing network platform, thereby controlling the corresponding object.

In some embodiments, when the IoT system is applied to smart city management, it may be referred to as the IoT system in a smart city.

Figure 2:
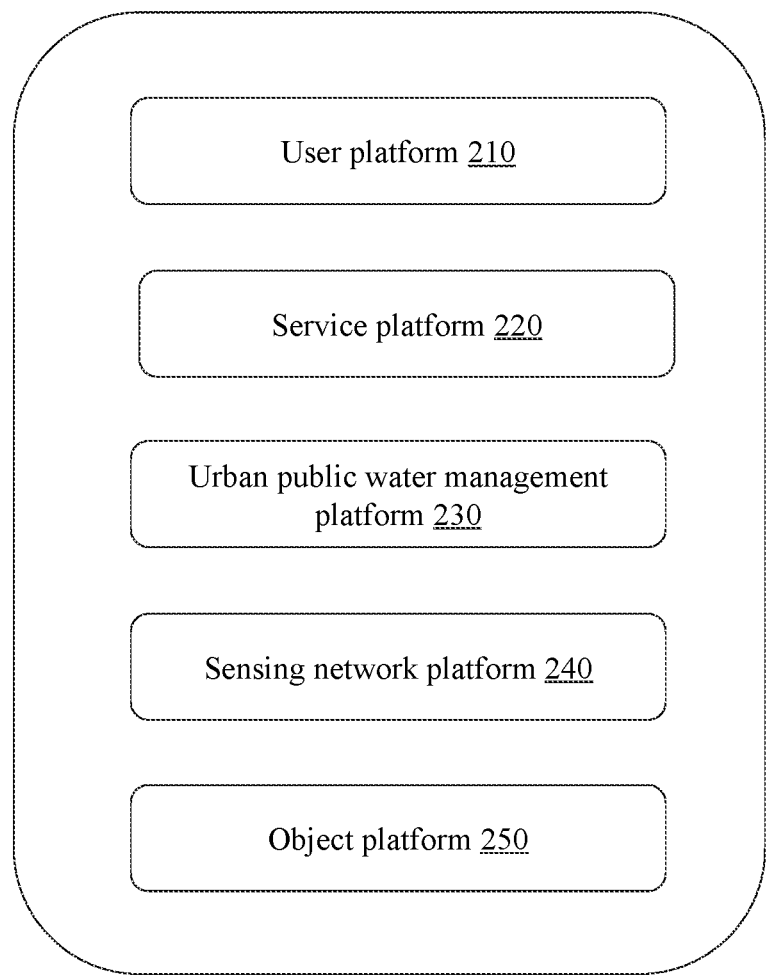
FIG. 2 is an exemplary platform structure diagram illustrating the public water processing system according to some embodiments of the present disclosure.

FIG. 2 is an exemplary platform structure diagram illustrating a system 200 for managing public water in a smart city according to some embodiments of the present disclosure. As shown in FIG. 2, the system 200 for managing public water in a smart city may be implemented based on the IoT system, the system 200 may include a user platform 210, a service platform 220, an urban public water management platform 230, a sensing network platform 240 and an object platform 250. In some embodiments, the system 200 for managing public water in a smart city may be implemented by the processing device 110 or part of the processing device 110.

In some embodiments, the system 200 for managing public water in a smart city may be applied to a variety of scenes of public water processing. In some embodiments, the system 200 for managing public water in a smart city may respectively obtain rainfall data and rainwater collection data in various scenes, to obtain public water processing strategies in various scenes. In some embodiments, the system 200 for managing public water in a smart city may obtain public water processing strategies of the entire area (such as the entire city) based on the rainfall data and rainwater collection data in various scenes.

A variety of scenes of public water processing may include scenes of predicting road water-logging, industrial consumption, agricultural water use, resident water use, maintenance plan for water delivery equipment, pipe replacement plan, or the like. For example, the scenes may include the collection and management of road rainwater, residential water supply plan management, or the like. It should be specified that the above scenes are only for the purpose of illustration, and are not intended to limit the application scenes of the system 200 for managing public water in a smart city. For those skilled in the art, the system may be applied to any other suitable scenes based on the present embodiments.

In some embodiments, the system 200 for managing public water in a smart city may be applied in the collection and management of the rainwater (water volume and water quality). When applied to the collection and management of the road rainwater, the object platform 250 may be configured to collect initial rainwater data, for example, the rainfall data may include rainfall volume, rainfall duration, rainwater quality, etc. The object platform 250 may upload the obtained the initial rainwater data to the sensing network platform 240. The sensing network platform 240 may summarize the collected data. For example, dividing the collected data according to the area, or according to the type of rainwater collection device, or the like. The sensing network platform 240 may then upload the further processed data to the urban public water management platform 230, and the urban public water management platform 230 may issue strategies or instructions related to the collection and management of the road rainwater based on the processes performed on the collected data. The instructions may include: rainwater collection instructions, water volume detection instructions, rainwater purifying instructions, or the like.

In some embodiments, the system 200 for managing public water in a smart city may be applied to the residential water supply plan management. When applied to the residential water supply plan management, the user platform 210 may receive the user's water demand, and transfer the user's water demand to the urban public water management platform 230 through the service platform 220. The urban public water management platform 230 may calculate the user's water demand to determine a water supply plan, and transmit the data to the sensing network platform 240. The sensing network platform 240 may pass the data to the object platform 250, and issue the strategies or instructions related to the residential water supply, such as controlling the collection terminal 140 to start collecting information on water volume, water quality, or the like.

In some embodiments, the system 200 for managing public water in a smart city may consist of a plurality of public water processing sub-systems in a smart city, and each sub-system may be applied to a specific scene. The system 200 for managing public water in a smart city may perform comprehensive management to the data obtained and output by each sub-system, thereby obtain the relevant strategies or instructions used to assist public water processing in a smart city.

For example, the system 200 for managing public water in a smart city may include a supply plan managing sub-system based on the industrial consumption, a water proof managing sub-system based on the rainfall condition and a residential water supply managing system for determining the residential water supply plan based on the resident water use plan, or the like. The system 200 for managing public water in a smart city may be the upper system of each sub-system.

The following will take the system 200 for managing public water in a smart city managing each sub-system and obtain corresponding data based on the sub-system to obtain strategies used in public water processing in a smart city as an example for illustration:

The system 200 for managing public water in a smart city may manage the sub-system based on the supply plan of industrial consumption, obtain industrial consumption demand through the user platform 210, and transfer it to the urban public water management platform 230 through the service platform 220. The urban public water management platform 230 may determine a rainwater supply plan based on the data of user's demand, and send relevant instructions such as rainwater collection instructions, rainwater storage instructions, etc. to the object platform 250 through the sensing network platform 240.

When obtaining the above data, the system 200 for managing public water in a smart city may independently set a plurality of object platforms corresponding to each sub-system and perform data collection.

After obtaining the above data, the collected data may be summarized through the sensing network platform 240. The further summarized data may be uploaded to the urban public water management platform 230, which may produce prediction data related to urban public water processing based on the processing of the collected data.

For example, the sensing network platform 240 may determine the amount of purified rainwater prediction and the amount of rainwater storage prediction based on the rainwater collection data, rainwater storage data etc. obtained by the object platform 250. The sensing network platform 240 may upload the above data to the urban public water management platform 230, which may further determine the rainwater storage plan and water supply plan of each area within the future period based on the above predicted amount of purified rainwater, amount of rainwater storage, and industrial consumption demand of each area, while adjusting the rainwater collection instructions, rainwater storage instructions, etc.

For those skilled in the art, after understanding the principles of the system, the system may be applied to any other suitable scenes under the condition of not departing from the principles.

The following will take applying the system 200 for managing public water in a smart city to a scene of water supply plan management as an example to have a specific illustration on the system 200 for managing public water in a smart city.

The user platform 210 may refer to a platform to obtain user's demand, which is the basis and the leader of the IoT operation system. In some embodiments, the user platform 210 may obtain the user's water use plan such as water consumption, the time of water using, etc., and send it to the service platform 220.

The service platform 220 may refer to a platform that provides input and output services for the user. In some embodiments, the service platform may connect the user platform and the urban public water management platform to implement information communication between the platforms, and provide input and output services for the user. For example, the service platform 220 may obtain the water use plan through the user platform 210, and the urban public water management platform may obtain the water use plan of each area from the service platform.

The urban public water management platform 230 may refer to a platform managing water in a city. In some embodiments, the urban public water management platform 230 may belong to a management platform. The urban public water management platform 230 may be configured to obtain the initial rainwater data of each area, the water use plan of each area, and the significance of each area through the sensing network platform, process the initial rainwater data of each area to obtain the rainwater storage plan of each area within the future period, and determine the water supply plan of each area within the future period based on the rainwater storage plan of each area within the future period, the water use plan of each area and the significance of each area.

In some embodiments, the urban public water management platform 230 may include at least one management sub-platform and a management platform database. In some embodiments, the at least one management sub-platform may obtain the initial rainwater data of at least one area from the sensing network platform 240, and process the initial rainwater data, and obtain the rainwater storage plan of at least one area within a second period based on the processing result. The at least one management sub-platform may further upload the rainwater storage plan of at least one area within the second period to the management platform database.

In some embodiments, the urban public water management platform 230 may include a management information integrated management platform. In some embodiments, the management information integrated management platform may obtain the rainwater storage plan of at least one target area within the second period from the management platform database based on the water use plan. In some embodiments, the management information integrated management platform may determine the rainwater storage plan of at least one target area within the second period based on the obtained water use plan, the rainwater storage plan of at least one target area within the second period, and the significance of the target area.

In some embodiments, the management information integrated management platform may obtain or send data through the service platform 220.

Figure 3:
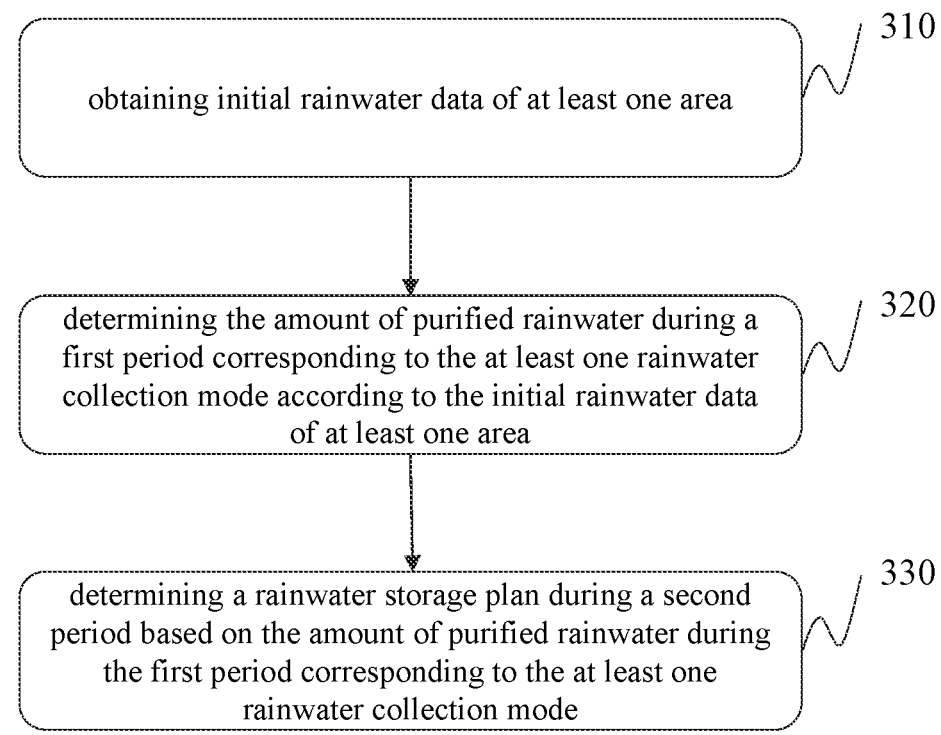
FIG. 3 is an exemplary flowchart illustrating a public water processing method according to some embodiments of the present disclosure.
Figure 4:
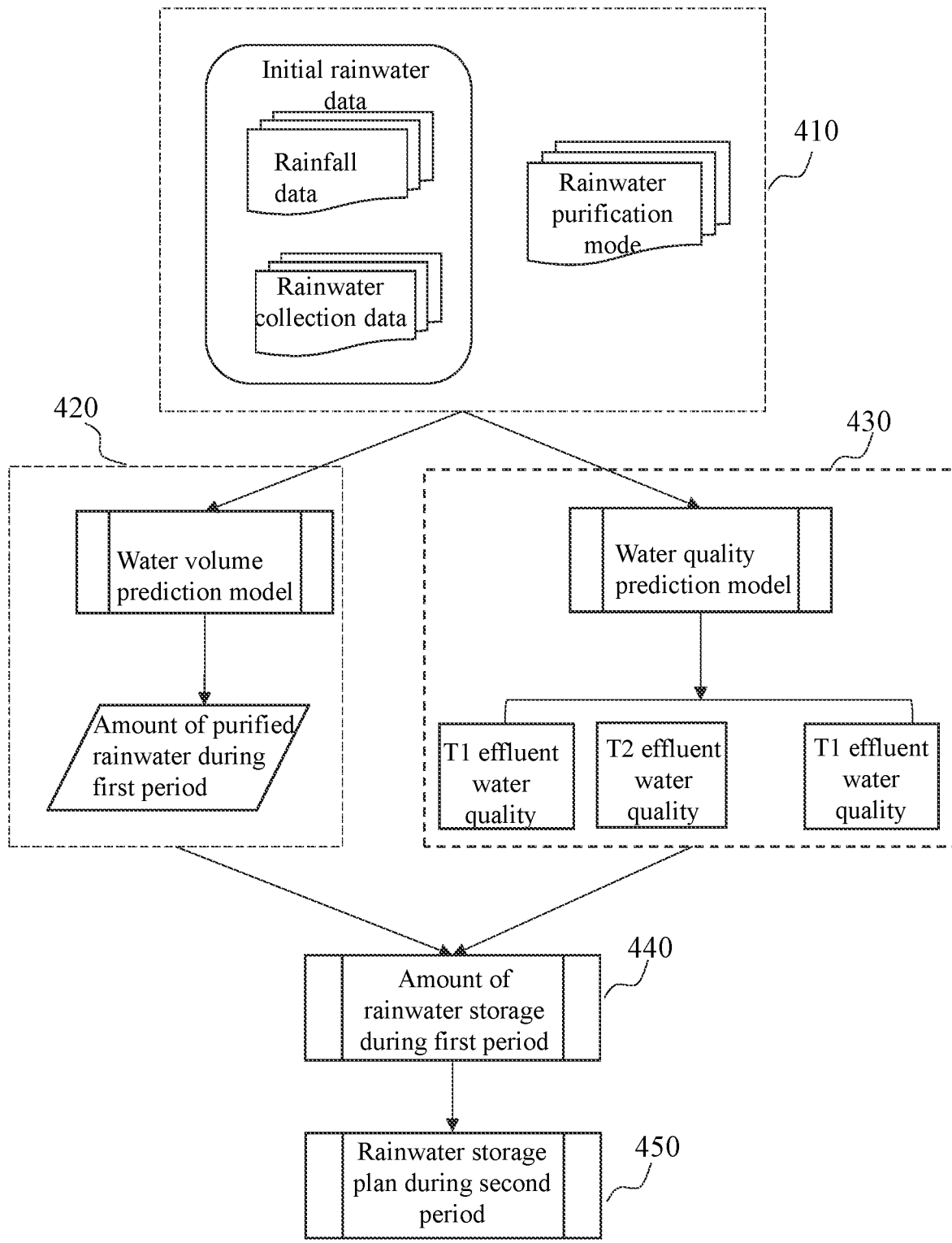
FIG. 4 is an exemplary flowchart illustrating a process of the determination of the rainwater storage plan during the second period according to some embodiments of the present disclosure.

More details on urban public water management platform 230 may be referred to FIGS. 3-5 and the descriptions thereof.

The sensing network platform 240 may refer to a platform for unified management of sensing communication, or may be further referred to as the sensing network management platform or the sensing network management server. In some embodiments, the sensing network platform may connect the management platform and the object platform to achieve the functions of perceptual information sensing communication and control information sensing communication.

In some embodiments, the sensing network platform may communicate with the urban public water management platform to provide relevant information and/or data (such as initial rainwater data) for the urban public water management platform.

In some embodiments, the sensing network platform 240 may further include at least one sensing network sub-platform and a sensing network platform database. The sensing network platform database may obtain the initial rainwater data through the object platform 250. The at least one sensing network sub-platform may obtain the initial rainwater data through the sensing network platform database, further summarize the data, and upload the data to the urban public water management platform 230.

In some embodiments, the sensing network platform 240 may further include a sensing information-integrated management platform. The sensing information-integrated management platform may obtain the initial rainwater data from the at least one sensing network sub-platform, further summarize the data, and upload the data to the urban public water management platform 230.

The object platform 250 may refer to a functional platform where the perceptual information generates and where the control information is ultimately performed. It may be a platform where the user's will be finally implemented. In some embodiments, the object platform 250 may obtain information. The information obtained may be used as an information input of the entire IoT.

The perceptual information may refer to the information obtained by a physical entity. For example, the information obtained by a sensor. The control information may refer to the control information formed after performing recognition, verification, analysis, transformation etc. on the perceptual information, for example, a control instruction.

The object platform 250 may communicate with the sensing network platform. It may be configured as a collection terminal and obtain data. The collection terminal may refer to a device that collects data related to water resources.

In some embodiments, the object platform 250 may be configured as a rainwater detection device and a rainwater collection detection device of at least a kind of rainwater collection system. For example, the rainwater detection devices may include a rainfall detection device and a water quality detection device, wherein the rainfall detection device may include a rainfall measuring glass, a rainfall gauge, an ombrometer, or the like. The water quality detection device may include a water quality sampler, a water quality detector, or the like. For another example, the rainwater collection detection devices of the rainwater collection system may include a water volume detection device and a water quality detection device. The water volume detection device may include a water volume detector, a water level detector, a water flow detection sensor, or the like. The water quality detection device may adopt the same water quality detection device as that in the rainwater detection device.

In some embodiments, the collection terminal may be managed by the object platform. The information obtained by the collection terminal may be taken as an information input of the entire IoT.

It should be noted that the above descriptions of the system and its components are merely provided for the purpose of illustration, and not intended to limit the scope of the present disclosure. It will be appreciated that for those skilled in the art, after understanding the principle of the system, any combinations may be made for each component, or constitute a subsystem to connect with other components under the condition of not departing from the principles. For example, the sensing network platform and the urban public water management platform may be integrated into one component. For another example, all components may share one storage device, and each component may further have its own storage device. Transformations of these kinds shall all be within the protection scope of the present disclosure.

FIG. 3 is an exemplary flowchart illustrating a public water processing method according to some embodiments of the present disclosure. As shown in FIG. 3, flow 300 may include the following operations. In some embodiments, the flow 300 may be performed by urban public water management platform 230.

In 310, obtaining initial rainwater data of at least one area.

The area may refer to an area in need of water resources management, and it may be manually divided based on the demand. In some embodiments, the area may be divided based on administrative provinces, cities and/or districts of the cities, and may further be divided based on the size of the area. For example, the area may be divided based on the administrative divisions of Sichuan Province (such as Chengdu City, Mianyang City, Luzhou City). For another example, the area may be divided based on the area (e.g., every 100 km$^2$) of the whole Sichuan Province according to.

Initial rainwater data may refer to unprocessed data obtained by a rainwater detection device. In some embodiments, the initial rainwater data may include rainfall data and rainwater collection data of at least one rainwater collection system.

The rainfall data may refer to data related to rainfall. In some embodiments, the rainfall data may include data such as a rainfall volume within a certain period, a rainfall duration, and a rainfall level. For example, the rainfall volume during January 2020 is 15 mm.

The rainwater collection system may refer to a system configured to collect and process rainwater collected in different scenes, and to perform storage, integration, and other processes on the related data. In some embodiments, at least one rainwater collection system may be included in different scenes. For example, a roof rainwater collection system, a ground rainwater collection system, and a road rainwater collection system may be included.

In some embodiments, each of the at least one rainwater collection system may include at least one rainwater collection mode. For example, a roof rainwater collection mode corresponding to the roof rainwater collection system may include collecting water by green plants, collecting water by reservoirs, or the like; a ground rainwater collection mode corresponding to the ground rainwater collection system may include collecting water by ground infiltration, collecting water by permeable pavement, collecting water by green space, or the like; a road rainwater collection mode corresponding to the road rainwater collection system may include filtering path flow, or the like.

The rainwater collection data may refer to related rainwater data obtained by the rainwater collection system. In some embodiments, the rainwater collection data may include data obtained by different rainwater collection modes, and/or data obtained by summarizing the data obtained by various rainwater collection modes. For example, the rainwater collection data may include the water collection volume of a reservoir obtained in the roof rainwater collection mode, and the water collection volume of permeable pavement obtained by the ground rainwater collection mode. For another example, the rainwater collection data may further include total water collection volume by various rainwater collections, the remaining water storage volume of the tank, and water quality, etc.

In some embodiments, the urban public water management platform 230 may communicate with a sensing network platform to obtain the initial rainwater data of at least one area. For example, the urban public water management platform 230 may obtain initial rainwater data of at least one area through the sensing network platform 120.

In some embodiments, the initial rainwater data of at least one area may be obtained based on the sensing network platform.

The sensing network platform may refer to a platform connecting with the urban public water management platform. The sensing network platform may be configured for sensing communication of perceptual information and control information. More information about the sensing network platform may be referred to FIG. 2 and the detailed descriptions thereof.

In 320, determining the amount of purified rainwater during a first period corresponding to the at least one rainwater collection mode according to the initial rainwater data of at least one area.

The first period may refer to the time when the rainwater may be purified within a preset period in the future of an area. In some embodiments, the first period may be a manually preset period according to the initial rainwater data of the area. For example, the first period may be any period in the next 12 hours, the next 24 hours, the next 48 hours, or the like.

The amount of purified rainwater in the first period may be the amount of pure water obtained from purifying the collected rainwater through at least one rainwater purification mode in the future period. In some embodiments, the rainwater purification mode may include one or any of the combinations of filtration, precipitation, coagulation, adsorption, membrane separation, or the like.

In some embodiments, the amount of purified rainwater in the first period may include an amount of purified rainwater corresponding to at least one rainwater collection mode. For example, based on the roof rainwater collection mode, the amount of purified rainwater on the roof may be correspondently determined.

In some embodiments, the amount of purified rainwater in the first period may be calculated by the urban public water management platform.

The determining the amount of purified rainwater during the first period corresponding to the at least one rainwater collection mode may include: determining the amount of purified rainwater during the first period corresponding to the at least one rainwater collection mode through a rainwater volume prediction model based on rainfall data, rainwater collection data, and rainwater purification mode.

In some embodiments, each of the at least one rainwater collection mode may correspond to at least one water volume prediction model. For example, the roof rainwater collection mode may correspond to a roof rainwater volume prediction model.

In some embodiments, the water volume prediction model may be configured to determine the amount of purified rainwater during the first period. The water volume prediction model may be trained based on historical rainfall data, rainwater collection data and rainwater purification mode.

More information on the water volume prediction model may be referred to FIG. 4 and the detailed description thereof.

In 330, determining a rainwater storage plan during a second period based on the amount of purified rainwater during the first period corresponding to the at least one rainwater collection mode.

The second period may be time for performing a rainwater storage plan in an area within a preset period in the future. In some embodiments, the second period may include the first period. For example, the second period may be a period of the next month, and the first period may be a period of the next 24 hours.

The rainwater storage plan during the second period may include the amount of rainwater planned to store in a future period (second period), as well as the start point in time and the end point in time of rainwater storage. In some embodiments, the second period may include the start point in time and the end point in time of rainwater storage. For example, the amount of rainwater storage in a certain area from Apr. 1, 2022 to Apr. 7, 2022 is 1 ton, the start point of rainwater storage is 8 a.m. on Apr. 1, 2022, and the end point is 5 p.m. on Apr. 7, 2022.

In some embodiments, the rainwater storage plan during the second period may be determined based on the amount of purified rainwater during the first period corresponding to the at least one rainwater collection mode.

In some embodiments, the rainwater storage plan in the second period may be calculated by the urban public water management platform.

In some embodiments, each of the at least one rainwater collection mode is corresponding to a water quality prediction model. The determining the rainwater storage plan during the second period based on the first period corresponding to the at least one rainwater collection mode may include: determining effluent water quality of at least one point in time within the first period through a water quality prediction model corresponding to at least one rainwater collection mode based on the rainfall data, the rainwater collection data, and the rainwater purification mode; determining the amount of rainwater storage during the first period based on the effluent water quality of at least one point in time within the first period and the amount of purified rainwater during the first period; and determining the rainwater storage plan during the second period based on the amount of rainwater storage during the first period.

In some embodiments, each of the rainwater collection modes may correspond to a water quality prediction model. For example, the ground rainwater collection mode corresponds to ground rainwater quality prediction model.

In some embodiments, the water quality model may be configured to determine the effluent water quality of at least one point in time in the first period.

More information on the water quality prediction model may be referred to FIG. 4 and detailed descriptions thereof.

In some embodiments, the amount of rainwater storage in the first period may be determined based on the effluent water quality of at least one point in time within the first period and the amount of purified rainwater during the first period. The amount of rainwater storage in the first period may theoretically be the total amount of rainwater obtained through various collection modes in the first period, including the amount of purified rainwater corresponding to at least one rainwater collection mode. In some embodiments, the amount of rainwater storage in the first period may include all of or any part of the amount of purified rainwater of the roof rainwater, the amount of purified rainwater of ground rainwater, and/or the amount of purified road rainwater.

In some embodiments, the rainwater storage plan during the second period may be determined based on the amount of rainwater storage during the first period. More about determining the rainwater storage plan during the second period may be referred to FIG. 4 and the detailed description thereof.

Some embodiments of the present disclosure may obtain the initial rainwater data of a plurality of areas based on a plurality of rainwater collection modes to determine the amount of purified rainwater within a future period, and the rainwater storage plan within the future period may be obtained based on the amount of purified rainwater, thereby improving the efficiency and accuracy of water resource management.

FIG. 4 is an exemplary flowchart illustrating the determination of the rainwater storage plan during the second period according to some embodiments of the present disclosure. As shown in FIG. 4, the flow 400 may include the following operations. In some embodiments, the flow 400 may be performed by the urban public water management platform 230.

In 410, obtaining initial rainwater data and the rainwater purification mode.

In some embodiments, the initial rainwater data may include rainfall data and rainwater collection data of at least one rainwater collection system. The rainfall data may include rainfall level, rainfall volume, rainfall duration, etc. The rainwater collection data may include drainage volume, water intake volume, reservoir volume, etc. obtained by various rainwater collection systems.

In some embodiments, the initial rainwater data may be transmitted to an object platform through a collection terminal 140, and passed through a sensing network platform to an urban public water management platform.

In 420, the urban public water management platform may determine the amount of purified rainwater corresponding to at least one rainwater collection mode in the first period through a water volume prediction model based on the obtained initial rainwater data and rainwater purification mode.

The water volume prediction model may be a model for determining the amount of purified rainwater during the first period. In some embodiments, each of the rainwater collection modes may correspond to at least one water volume prediction model. For example, a roof rainwater collection mode may correspond to a roof rainwater volume prediction model.

The water volume prediction model may refer to a machine learning model after training. In some embodiments, the water volume prediction model may include any one or combination of a deep neural network model, a recurrent neural network models, a convolutional neural network, or other customized model structures.

In some embodiments, the input of the water volume prediction model may be the initial rainwater data, including rainfall data and rainwater collection data, as well as rainwater collection mode. For example, by inputting the rainfall data and the amount of roof drainage of a certain area on Apr. 1, 2022 to a roof rainwater volume prediction model, the model may output the amount of purified rainwater of the area within the first period.

In some embodiments, the water volume prediction model may be obtained based on training. Training of the water volume prediction model may be performed by the urban public water management platform.

In some embodiments, when training the water volume prediction model, a plurality of training samples with labels may be used to train through various modes (for example, gradient descent), so that the parameters of the model may be learned. When the trained model meets preset conditions, the training ends, and a trained water volume prediction model may be obtained.

The training samples may include historical rainfall data, historical rainwater collection data and corresponding rainwater purification mode obtained by months, quarters, and years. The labels of training samples may be the amount of purified rainwater based on historical time nodes. The labels of the training samples may be obtained through manual labeling. For example, manual labeling may be performed on the amount of purified rainwater of historical time nodes based on the historical rainfall data, the historical rainwater collection data, and corresponding rainwater purification mode. In some embodiments, the water volume prediction model may be trained by other devices or modules.

Some embodiments of the present disclosure may determine the amount of purified rainwater during the first period based on the water volume prediction model. The amount of purified rainwater that may be obtained in each area in a future period may be pre-determined, which is beneficial for calculating an amount of rainwater storage, and make the rainwater storage plan in advance.

In 430, the urban public water management platform may determine effluent water quality of at least one point in time within the first period through a water quality prediction model corresponding to the at least one rainwater collection mode based on the initial rainwater data and the rainwater purification mode.

In some embodiments, the water quality prediction model may be a model for determining effluent water quality of at least one point in time within the first period. In some embodiments, each of the at least one rainwater collection mode may correspond to at least one water quality prediction model. For example, a ground rainwater collection mode may correspond to a water quality prediction model of ground rainwater.

The water quality prediction model may refer to a trained machine learning model. In some embodiments, the water quality prediction model may include any one or combination of a deep neural network model, a recurrent neural network models, a convolutional neural network, or other customized model structures.

In some embodiments, the input of the water quality prediction model may be the initial rainwater data, including rainfall data and rainwater collection data, as well as rainwater collection modes. For example, by inputting the rainfall data and the amount of roof drainage of a certain area on Apr. 1, 2022 to a roof rainwater quality prediction model, the model may output the effluent water quality of the area within the first period.

In some embodiments, the water quality prediction model may be obtained based on training. The training of the water quality prediction model may be performed by the urban public water management platform.

In some embodiments, when training a water quality prediction model, a plurality of training samples with labels may be used to train through various modes (for example, gradient descent), so that the parameters of the model may be learned. When the trained model meets preset conditions, the training ends, and a trained water quality prediction model may be obtained.

The training samples may include the historical rainfall data, the historical rainwater collection data and the corresponding rainwater purification mode obtained by months, quarters, and years. The labels of training samples may be the effluent water quality based on the historical time nodes. The labels of the training samples may be obtained through manual labeling. For example, manual labeling may be performed on the effluent water quality of historical time nodes based on the historical rainfall data, the historical rainwater collection data, and corresponding rainwater purification mode. In some embodiments, the water quality prediction model may be trained in other devices or modules.

Some of the embodiments of the present disclosure may determine the effluent water quality of at least one point in time within the first period through the water quality prediction model, and may further determine whether the quality of the purified rainwater reaches a standard, and the rainwater that does not reach the standard may be discharged as sewage, while the rainwater that reaches the standard may be stored as qualified water, allowing more accurate rainwater storage.

In some embodiments, the water volume prediction model and/or the water quality prediction model may include: a feature extraction network and a prediction network. Feature extraction network parameters of the water volume prediction model and the water quality prediction model may be the same.

In some embodiments, the water volume prediction model and/or the water quality prediction model may include the feature extraction network and the prediction network. The feature extraction network may be configured to extract data features of the initial rainwater data, and the water volume prediction network may be configured to determine the amount of purified rainwater during the first period. The water quality prediction network may be configured to determine the effluent water quality of at least one point in time within the first period.

In some embodiments, the feature extraction network parameters of the water volume prediction model and the water quality prediction model may be the same.

In some embodiments, the water volume prediction model and the water quality prediction model may be obtained by training a joint model. The joint model may include the feature extraction networks, the water volume prediction networks, and the water quality prediction networks. The loss function used by the joint training may be the sum of the loss functions of the water volume prediction model and the water quality prediction model.

In some embodiments, the training sample of the joint model may include the historical initial rainwater data and the corresponding rainwater purification mode. The labels may be the amount of purified rainwater of a certain period corresponding to a historical node and the effluent water quality of a certain period. The labels of the training samples may be obtained through manual labeling. For example, manual labeling may be performed on the amount of purified rainwater and effluent water quality of historical time nodes based on the historical rainfall data, the historical rainwater collection data, and corresponding rainwater purification mode.

In some embodiments, data of the joint model may be trained by migrating learning. First a water volume prediction model may be trained, then the feature extraction network part of the water volume prediction model may be copied to the water quality prediction model as the corresponding part of the water quality prediction model. The prediction network part of the water quality prediction model may be randomly initialized, and then the water quality prediction model may be trained using training data and training labels.

Through the joint training of two models, some embodiments of the present disclosure may help to solve the problems of insufficient data or difficult to obtain labels when training models independently, and may further reduce the load intensity of the calculating processor, thereby improving the calculating efficiency.

In 440, determining the amount of rainwater storage during the first period based on the amount of purified rainwater during the first period and the effluent water quality of at least one point in time of the first period.

In some embodiments, the amount of purified rainwater in the first period may include the amount of purified rainwater of a plurality of time intervals of the first period; the determining the amount of rainwater storage during the first period based on the amount of purified water during the first period and the effluent water quality of at least one point in time within the first period may include: determining a first point in time when the water quality meets the preset conditions from the effluent water quality of at least one point in time of the first period as a target point in time; determining the amount of purified rainwater during the first period based on the target point in time and the amount of purified rainwater of the plurality of time intervals.

In some embodiments, the amount of purified rainwater during the first period may include the amount of purified rainwater in a plurality of time intervals of the first period. For example, the first period may be divided into a plurality of time intervals. If the first period is the next 24 hours, the period may be divided into time intervals of every 3 hours.

In some embodiments, the urban public water management platform may determine a first point in time when the water quality meets the preset conditions from the effluent water quality of at least one point in time of the first period as a target point in time. The preset conditions of the water quality may be the requirements on the cleanliness of the rainwater.

In some embodiments, the urban public water management platform may determine the amount of purified rainwater during the first period based on the amount of purified rainwater of a plurality of time intervals and the target point in time. For example, the first period may be divided into 8 time intervals and the urban public water management platform may obtain the amount of purified rainwater in 8 time intervals, and obtain water quality of rainwater at regular intervals. When the effluent water quality of a certain point in time meets the preset conditions, the point in time may be determined as the target point in time, and the amount of purified rainwater at the target point in time may be determined as well.

In 450, determining the rainwater storage plan during the second period based on the amount of rainwater storage during the first period corresponding to the at least one rainwater collection mode.

In some embodiments, the urban public water management platform may determine the rainwater storage plan during the second period based on the amount of rainwater storage during the first period of each area. In some embodiments, the amount of rainwater storage during the first period may be equal to or unequal to the amount of rainwater in the rainwater storage plan during the second period. For example, if the amount of rainwater storage during the first period is greater than the amount of rainwater in the rainwater storage plan during the second period, the excess rainwater storage may be released and the amount of rainwater may be stored according to the plan; if the amount of rainwater storage during the first period is smaller than the amount of rainwater in the rainwater storage plan during the second period, which means that the amount of rainwater storage during the first period does not meet the plan, then the rainwater of the next period needs to be stored, or other measures need to be taken to meet the amount of rainwater storage according to the plan.

Some embodiments of the present disclosure may determine the amount of purified rainwater and the rainwater storage plan through the machine learning model, and perform integrated calculation on the various data, thereby improving the efficiency of data processing.

FIG. 5 is an exemplary flowchart illustrating the determination of water supply plan of a target area according to some embodiments of the present disclosure. As shown in FIG. 5, the flow 500 may include the following operations. In some embodiments, the flow 500 may be performed by the urban public water management platform 220.

In 510, obtaining a rainwater storage plan of a second period of at least one target area from a management platform database based on a water use plan.

The water use plan may refer to the required water consumption of the user within the future period. The target area may refer to the area where the water use plan is implemented. In some embodiments, the urban public water management platform may obtain the water use plan through a service platform, and the service platform may obtain related data of the water use plan through a user platform.

In some embodiments, the rainwater storage plan during the second period may be determined through a management sub-platform. Detailed contents on determining the rainwater storage plan may be referred to in FIG. 4 and the detailed description.

In 520, determining the water supply plan during the second period of the at least one target area based on the obtained water use plan, the rainwater storage plan during the second period of the at least one target area and the significance of the target area.

The significance of the target area may refer to the urgency of the users' water demand in the area. In some embodiments, the significance of the target area may be graded based on the degree of urgency of the users' water demand. For example, the significance of the target area may be divided into level I (generally urgent), II (more urgent), level III (very urgent). For example, the basic water for life of users in area A may be guaranteed, then the significance of the water demand may be level I (generally urgent); area B has been experiencing droughts for years, which leads to a low survival rate for crops, and the residents have a shortage for water in their life, then the significance of their water demand may be level II (more urgent). As the significance of area B is higher, the urban public water management platform may prioritize the water supply plan of area B.

The water supply plan may be a strategy for dispatching water resources based on the water demand of each area. In some embodiments, the water supply plan may include the amount of water delivered to the target area and the delivery time. For example, area A has abundant rainfall and adequate rainwater storage in 2021, while area B has less rainfall in 2021, and the rainwater storage may not be sufficient to meet user's demands, then to meet the user's demand, a management information integrated management platform may dispatch the water resources of the area A to the area B.

In some embodiments, the management information integrated management platform may determine the water supply plan during the second period of at least one target area based on the obtained water use plan, the rainwater storage plan during the second period of the at least one target area, and the significance of the target area.

In some embodiments, the management information integrated management platform may perform comprehensive analysis on the water use plan, the rainwater storage plan, and the significance of the target area. For example, the management information integrated management platform may determine whether the water supply of the area A is sufficient based on the rainwater storage plan and the water use plan of the area A. If the rainwater storage plan in the area A is greater than the water use plan, then the water resources are sufficient. For another example, the management information integrated management platform may determine the water supply plan by comparing the relevant data of area A and area B. If the water resources in the area A are sufficient and the area is dominated by residential water use, while the rainfall in the area B is insufficient, and the area includes a large amount of industrial consumption, then the water supply plan may give priority to the water demand of the area B, or to dispatch water resources in the area A to the area B.

In some embodiments of the present disclosure, the urban public water management platform may perform data processing through sub-platforms to release the pressure of data processing and calculation, thereby realizing data classification; and determine the water supply plans of the various areas through comprehensive analysis of the water plan, rainwater storage plan, and significances of various areas, which helps to distribute water resources accurately, thereby realizing the reasonable use of water resources.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and be intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A method for managing public water in a smart city, which is performed by an urban public water management platform, the method comprising:

obtaining initial rainwater data in at least one area, the initial rainwater data including rainwater collection data of at least one rainwater collection system and rainfall data, each of the at least one rainwater collection system corresponding to at least one rainwater collection mode, wherein the initial rainwater data in the at least one area is obtained based on a sensing network platform, wherein each of the at least one rainwater collection mode corresponds to a water volume prediction model, and the water volume prediction model is a machine learning model, which is obtained by a training process including:

obtaining a plurality of first training samples and first labels, wherein the first training samples includes historical rainfall data, historical rainwater collection data, and corresponding rainwater purification mode, and the first labels are amount of purified rainwater of historical time node;

training an initial water volume prediction model based on the plurality of first training samples and the first labels; and obtaining the water volume prediction model until a trained water volume prediction model meeting a first preset condition;

each of the at least one rainwater collection mode corresponds to a water quality prediction model, and the water quality prediction model is a machine learning model, which is obtained by a training process including:

obtaining a plurality of second training samples and second labels, wherein the second training samples includes the historical rainfall data, the historical rainwater collection data, and the corresponding rainwater purification mode, and the second labels are effluent water quality of historical time node;

training an initial water quality prediction model based on the plurality of second training samples and the second labels; and obtaining the water quality prediction model until a trained water quality prediction model meeting a second preset condition;

determining, according to the initial rainwater data in the at least one area, an amount of purified rainwater during a first period, the amount of purified rainwater corresponding to the at least one rainwater collection mode, including:

determining, based on the initial rainwater data and the rainwater purification mode and through the water volume prediction model corresponding to the at least one rainwater collection mode, the amount of purified rainwater during the first period; and determining, based on the amount of purified rainwater during the first period corresponding to the at least one rainwater collection mode, a rainwater storage plan during a second period, including:

determining, based on the initial rainwater data and the rainwater purification mode and through the water quality prediction model corresponding to the at least one rainwater collection mode, effluent water quality of at least one point in time within the first period;

determining, based on the effluent water quality of at least one point in time within the first period and the amount of purified rainwater during the first period, an amount of rainwater storage during the first period; and determining, based on the amount of rainwater storage during the first period, the rainwater storage plan during the second period.

2. The method of claim 1, wherein the sensing network platform comprises at least one sensing network sub-platform and a sensing network platform database;

the sensing network platform database obtains the initial rainwater data through an object platform;

the at least one sensing network sub-platform obtains the initial rainwater data through the sensing network platform database; and the urban public water management platform obtains the initial rainwater data through the at least one sensing network sub-platform.

3. The method of claim 2, wherein the sensing network platform further comprises a sensing information-integrated management platform;

the sensing information-integrated management platform obtains the initial rainwater data from the at least one sensing network sub-platform; and the urban public water management platform obtains the initial rainwater data through the sensing information-integrated management platform.

4. The method of claim 2, wherein the object platform comprises:

a rainwater detection device and a rainwater collection detection device of the at least one rainwater collection system.

5. The method of claim 1, wherein the water volume prediction model and/or the water quality prediction model comprises:

a feature extraction network and a prediction network; and parameters of the feature extraction network of the water volume prediction model and the water quality prediction model are the same.

6. The method of claim 1, wherein the amount of purified rainwater during the first period comprises amounts of purified rainwater during a plurality of time intervals in the first period;

determining, based on the effluent water quality of at least one point in time within the first period and the amount of purified rainwater during the first period, the amount of rainwater storage during the first period comprises:

determining, from the effluent water quality of at least one point in time within the first period, a first point in time when water quality meets a preset condition as a target point in time; and determining, based on the target point in time and the amounts of purified rainwater during the plurality of time intervals, the amount of purified rainwater during the first period.

7. The method of claim 1, wherein the urban public water management platform further includes:

at least one management sub-platform and a management platform database;

the at least one management sub-platform obtains the initial rainwater data in at least one area, and obtains, based on the processing of the initial rainwater data, the rainwater storage plan during the second period of the at least one area; and the management platform database obtains the rainwater storage plan during the second period of the at least one area through the at least one management sub-platform.

8. The method of claim 7, wherein the urban public water management platform further includes:

a management information-integrated management platform;

the management information-integrated management platform obtains, based on a water use plan and from the management platform database, the rainwater storage plan during the second period of at least one target area, the water use plan being obtained through the user platform; and the management information-integrated management platform determines, based on the obtained water use plan, the rainwater storage plan during the second period of at least one target area, and a significance of the target area, a water supply plan during the second period of the at least one target area.

9. The method of claim 8, further comprising:

the management information-integrated management platform obtains and/or sends data through a service platform; and the service platform obtains and/or sends data through the user platform.

10. A system for managing public water in a smart city, the system comprising a user platform, a service platform, an urban public water management platform, a sensing network platform, and an object platform, wherein the urban public water management platform is configured to perform the following operations:

obtaining initial rainwater data in at least one area, the initial rainwater data including rainwater collection data of at least one rainwater collection system and rainfall data, each of the at least one rainwater collection system corresponding to at least one rainwater collection mode, wherein the initial rainwater data in the at least one area is obtained based on a sensing network platform, wherein each of the at least one rainwater collection mode corresponds to a water volume prediction model, and the water volume prediction model is a machine learning model, which is obtained by a training process including:

obtaining a plurality of first training samples and first labels, wherein the first training samples includes historical rainfall data, historical rainwater collection data, and corresponding rainwater purification mode, and the first labels are amount of purified rainwater of historical time node;

training an initial water volume prediction model based on the plurality of first training samples and the first labels; and obtaining the water volume prediction model until a trained water volume prediction model meeting a first preset condition;

each of the at least one rainwater collection mode corresponds to a water quality prediction model, and the water quality prediction model is a machine learning model, which is obtained by a training process including:

obtaining a plurality of second training samples and second labels, wherein the second training samples includes the historical rainfall data, the historical rainwater collection data, and the corresponding rainwater purification mode, and the second labels are effluent water quality of historical time node;

training an initial water quality prediction model based on the plurality of second training samples and the second labels; and obtaining the water quality prediction model until a trained water quality prediction model meeting a second preset condition;

determining, according to the initial rainwater data in the at least one area, an amount of purified rainwater during a first period, the amount of purified rainwater corresponding to the at least one rainwater collection mode, including:

determining, based on the initial rainwater data and the rainwater purification mode and through the water volume prediction model corresponding to the at least one rainwater collection mode, the amount of purified rainwater during the first period; and determining, based on the amount of purified rainwater during the first period corresponding to the at least one rainwater collection mode, a rainwater storage plan during a second period, including:

determining, based on the initial rainwater data and the rainwater purification mode and through the water quality prediction model corresponding to the at least one rainwater collection mode, effluent water quality of at least one point in time within the first period;

determining, based on the effluent water quality of at least one point in time within the first period and the amount of purified rainwater during the first period, an amount of rainwater storage during the first period; and determining, based on the amount of rainwater storage during the first period, the rainwater storage plan during the second period.

11. A non-transitory computer readable storage medium storing computer instructions, wherein when a computer reads the computer instruction in the storage medium, the computer operates a method for managing public water in a smart city, the method comprising:

obtaining initial rainwater data in at least one area, the initial rainwater data including rainwater collection data of at least one rainwater collection system and rainfall data, each of the at least one rainwater collection system corresponding to at least one rainwater collection mode, wherein the initial rainwater data in the at least one area is obtained based on a sensing network platform, wherein each of the at least one rainwater collection mode corresponds to a water volume prediction model, and the water volume prediction model is a machine learning model, which is obtained by a training process including:

obtaining a plurality of first training samples and first labels, wherein the first training samples includes historical rainfall data, historical rainwater collection data, and corresponding rainwater purification mode, and the first labels are amount of purified rainwater of historical time node;

training an initial water volume prediction model based on the plurality of first training samples and the first labels; and obtaining the water volume prediction model until a trained water volume prediction model meeting a first preset condition;

each of the at least one rainwater collection mode corresponds to a water quality prediction model, and the water quality prediction model is a machine learning model, which is obtained by a training process including:

obtaining a plurality of second training samples and second labels, wherein the second training samples includes the historical rainfall data, the historical rainwater collection data, and the corresponding rainwater purification mode, and the second labels are effluent water quality of historical time node;

training an initial water quality prediction model based on the plurality of second training samples and the second labels; and obtaining the water quality prediction model until a trained water quality prediction model meeting a second preset condition;

determining, according to the initial rainwater data in the at least one area, an amount of purified rainwater during a first period, the amount of purified rainwater corresponding to the at least one rainwater collection mode, including:

determining, based on the initial rainwater data and the rainwater purification mode and through the water volume prediction model corresponding to the at least one rainwater collection mode, the amount of purified rainwater during the first period; and determining, based on the amount of purified rainwater during the first period corresponding to the at least one rainwater collection mode, a rainwater storage plan during a second period, including:

determining, based on the initial rainwater data and the rainwater purification mode and through the water quality prediction model corresponding to the at least one rainwater collection mode, effluent water quality of at least one point in time within the first period;

determining, based on the effluent water quality of at least one point in time within the first period and the amount of purified rainwater during the first period, an amount of rainwater storage during the first period; and determining, based on the amount of rainwater storage during the first period, the rainwater storage plan during the second period.

* * * * *